(12) United States Patent
Kim et al.

(10) Patent No.: US 7,630,702 B2
(45) Date of Patent: Dec. 8, 2009

(54) METHOD OF SUPPORTING SLEEP MODE IN BROADBAND WIRELESS ACCESS SYSTEM

(75) Inventors: Yong-Ho Kim, Bucheon (KR); Jin Lee, Seoul (KR); Yong-Won Kwak, Anyang (KR)

(73) Assignee: LG Electronics Inc., Seoul (KR)

( * ) Notice: Subject to any disclaimer, the term of this patent is extended or adjusted under 35 U.S.C. 154(b) by 691 days.

(21) Appl. No.: 11/388,412

(22) Filed: Mar. 24, 2006

(65) Prior Publication Data
US 2006/0240799 A1    Oct. 26, 2006

(30) Foreign Application Priority Data
Mar. 24, 2005  (KR)  ...................... 10-2005-0024699

(51) Int. Cl.
G06F 17/50  (2006.01)
O40B 1/38  (2006.01)
(52) U.S. Cl. .............. 455/343.4; 455/432.1; 455/456.1; 455/574; 703/13
(58) Field of Classification Search .................. 703/13; 455/574, 343.4, 432.1, 456.1; 370/331
See application file for complete search history.

(56) References Cited

U.S. PATENT DOCUMENTS

| | | | |
|---|---|---|---|
| 5,870,588 A * | 2/1999 | Rompaey et al. ............... 703/13 |
| 6,101,608 A | 8/2000 | Schmidt et al. | |
| 6,542,490 B1 | 4/2003 | Ahmadvand et al. | |
| 6,622,251 B1 | 9/2003 | Lindskog et al. | |
| 6,848,059 B2 | 1/2005 | Bullman et al. | |
| 7,130,668 B2 * | 10/2006 | Chang et al. ................. | 455/574 |
| 7,194,288 B2 * | 3/2007 | Lee et al. ..................... | 455/574 |
| 7,289,804 B2 * | 10/2007 | Kim ........................ | 455/432.1 |
| 7,430,421 B2 * | 9/2008 | Park ........................ | 455/456.1 |
| 7,450,926 B2 * | 11/2008 | Chang et al. ............. | 455/343.4 |
| 2005/0043050 A1 | 2/2005 | Lee et al. | |

FOREIGN PATENT DOCUMENTS

| GB | 2415573 A | 12/2005 |
|---|---|---|
| TW | 1268060 | 12/2006 |

* cited by examiner

*Primary Examiner*—William D Cumming
(74) *Attorney, Agent, or Firm*—Lee, Hong, Degerman, Kang & Waimey (57) ABSTRACT

The primitives between an upper management layer and the MAC layer within a mobile station and a base station are defined in order to specify and clarify the operations within the protocol stack layers in a broadband wireless access system to allow a mobile station to perform sleep mode. Media Independent Handover (MIH) procedures can be achieved because the NCMS and MIH layer can communicate through use of these primitives.

16 Claims, 5 Drawing Sheets

METHOD OF SUPPORTING SLEEP MODE IN BROADBAND WIRELESS ACCESS SYSTEM

CROSS REFERENCE TO RELATED APPLICATION

Pursuant to 35 U.S.C. § 119, this application claims the benefit of earlier filing date and right of priority to Korea Application No. 10-2005-24699, filed Mar. 24, 2005, the contents of which are hereby incorporated by reference herein in their entirety.

FIELD OF THE INVENTION

The present invention relates to a broadband wireless access system, and more particularly, to a method of clearly defining the primitives used for the protocol stack within the mobile station and the protocol stack within the base station, in order to effectively support a mobile station of a broadband wireless access system to change into sleep mode (idle mode).

BACKGROUND ART

The system of the IEEE 802.16e that is undergoing international standardization with respect to broadband wireless access systems, does not have a layered architecture comprised of a HLR (Home Location Register), a VLR (Visitor Location Register), a MSC (Mobile Switching Center), a BSC (Base Station Controller), a RNC (Radio Network Controller), and the like, as in the existing 2G and 3G mobile communication systems, but instead, is comprised of only a MSS (Mobile Subscriber Station), a BS (Base Station) and a ASA (Authentication Service Authorization).

Figure 1:
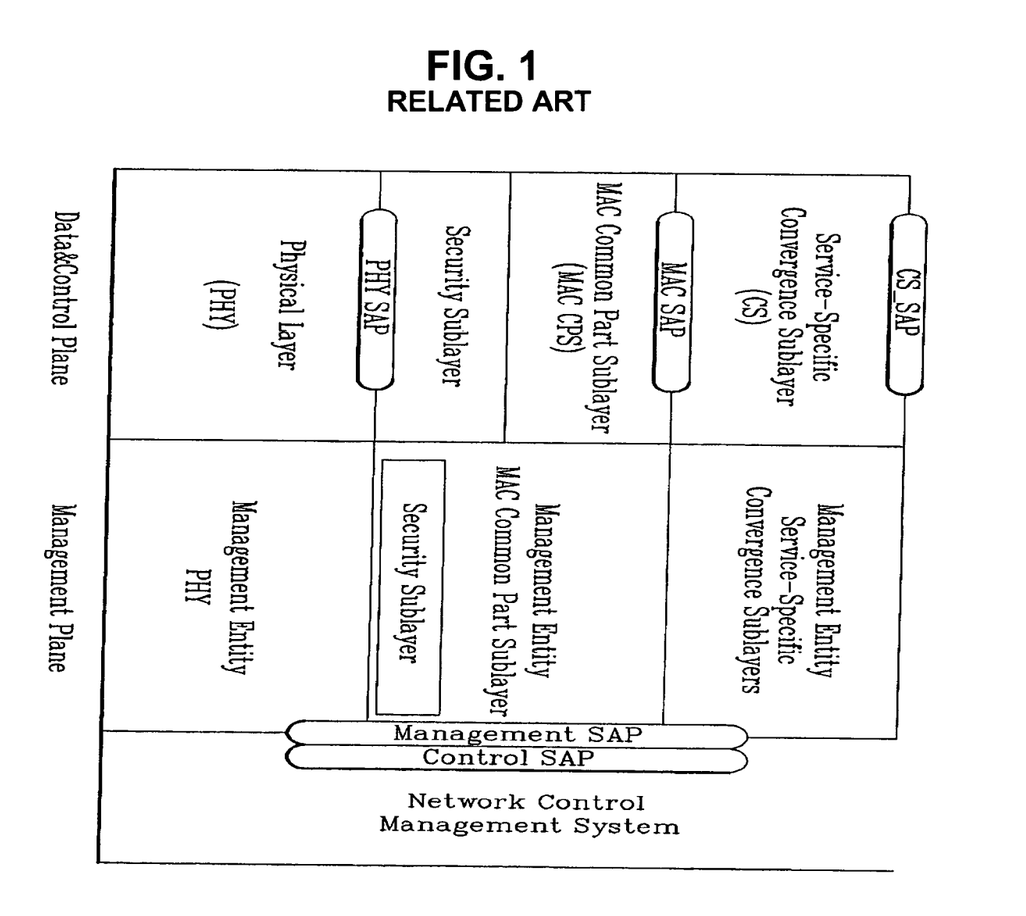
FIG. 1 depicts an exemplary protocol layer architecture for a broadband wireless access system.

The broadband wireless access system defines the protocols of the MAC (Medium Access Control) layer and the PHY (PHYsical) layer that are common between the base station and the mobile station (MSS). FIG. 1 depicts an exemplary protocol layer architecture for a broadband wireless access system.

To minimize power consumption of a mobile station in a broadband wireless access system, a sleep mode is supported. A mobile station in sleep mode has a sleep period (duration) comprised of a listening window and a sleep window.

During the listening window, the mobile station receives from the base station, a broadcasting type traffic downlink message that indicates whether any downlink traffic is being transmitted thereto or that indicates whether ranging needs to be performed for maintaining uplink communication and for maintaining appropriate downlink coding type according to signal quality. During the sleep period, in order to save power, the mobile station receives only a minimal amount of downlink signals from the base station, and during this period, the mobile station performs scanning of neighbor base stations for handover and performs ranging in order to maintain uplink communication and maintain appropriate downlink coding type according to signal quality.

The sleep mode can be divided into three power saving class groups having common characteristics: Type 1, Type 2, Type 3. Examples of messages used to support sleep mode are as follows:

The sleep request message (MOB_SLP_REQ) is delivered from the mobile station to the base station through a Basic CID (Connection Identifier), and is a message that defines the power saving class and requests its activation.

The sleep response message (MOB_SLP_RSP) is a message in response to the MOB_SLP_REQ message, and upon its receipt, the mobile station groups the connections of the power saving class and performs activation according to the request in the MOB_SLP_REQ message.

The traffic download message (MOB_TRF_IND) is only used in power saving class Type 1, and when a mobile station is in sleep mode, by sending information that indicates whether there is any downlink traffic to that mobile station, a mobile station having such traffic is allowed to terminate its sleep mode.

The ranging request message (RNG_REQ) is used to request an uplink/downlink channel descriptor that changes to be synchronized with the currently serving base station or to request frame number synchronization of the physical layer.

The ranging response message (RNG_RSP) is a message in response to the RNG_REQ message, and allows the base station and mobile station to maintain synchronization by providing values for periodic ranging.

Figure 2:
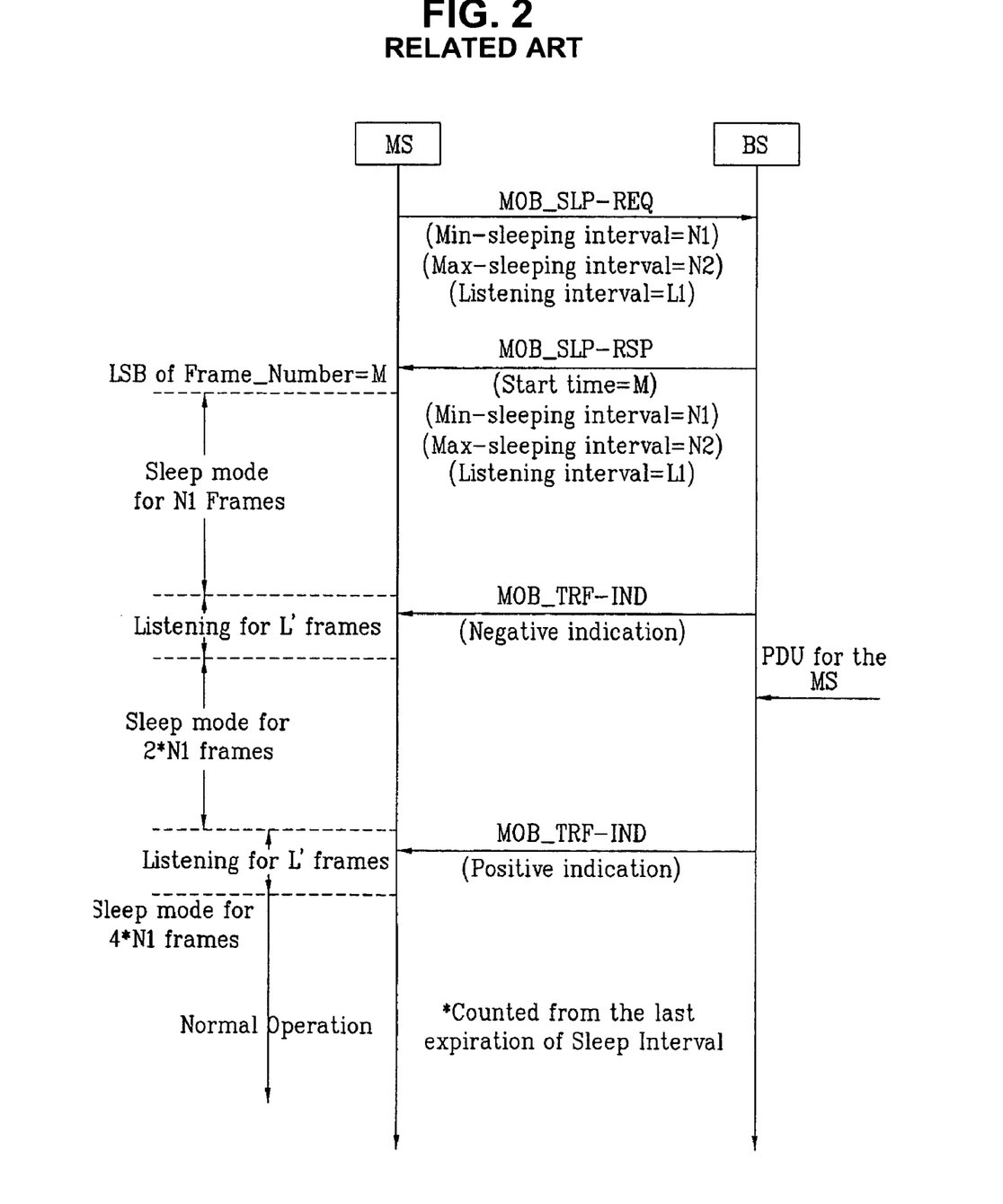
FIG. 2 depicts an exemplary signal flow for a sleep mode operation (power saving class type 1) according to the related art.

FIG. 2 depicts an exemplary signal flow for a sleep mode operation (power saving class type 1) according to the related art.

In order to minimize its power consumption, the mobile station sends a sleep mode request message (MOB_SLP-REQ) to the base station. In response, the base station sends information about a sleep mode start frame, listening period, sleep period, etc. via a response message (MOB_SLP-RSP) to authorize a change into sleep mode. Upon receiving such authorization for sleep mode, the mobile station can then change into sleep mode at the appropriate frame that was allowed in the MOB_SLP-RSP message. During the sleep period, with the exception of some special situations, the mobile station does not send or receive any MAC PDUs with the base station. If there is downlink traffic for the mobile station in sleep mode state, the base station sends a traffic downlink message the that mobile station to wake it up from its sleep mode state and allow data reception during the listening period. When the listening period ends, the mobile station returns to its sleep mode state.

As explained above, in the related art, the messages used by the mobile station to support sleep mode that are transmitted and received with the base station are defined, but the operations actually related to sleep mode are not defined for the protocol stack (layers) within the mobile station and the protocol stack (layers) within the base station. Namely, there are no definitions for the primitives with respect to information transferred between the MAC layer and upper management entity via the NCMS (Network Control Management System), within the protocol stacks of the mobile station and the base station, respectively.

SUMMARY

One aspect of the present invention involves the recognition by the present inventors of the drawbacks in the related art as explained above. In order to address such problems, the present invention provides a method of defining the primitives between an upper management layer and the MAC layer in order to specify and clarify the operations within the protocol stack layers in a broadband wireless access system to support a sleep mode operation of a mobile station.

BRIEF DESCRIPTION OF THE DRAWINGS

The accompanying drawings, which are included to provide a further understanding of the invention, are incorporated in and constitute a part of this application, illustrate embodiment(s) of the invention and together with the description serve to explain the principle of the invention. In the drawings.

DETAILED DESCRIPTION

The present invention is described as being implemented in a broadband wireless access system, such as a 802.16e network. However, the present invention may also be adapted and implemented in communication systems operating under other types of communication specifications (e.g., 802.16g, 802.21, 802.11u, etc.), because the concepts and teachings of the present invention could be applied to various communication schemes that operate in a similar manner based upon common techniques. Non-limiting exemplary embodiments of the present invention are explained below with reference to the attached Figures.

Also, certain aspects of the present invention will be described with respect to particular names for the entities, interfaces, primitives, messages, etc., but those skilled in the art will clearly understand that such names are non-limiting, as other names (label, terms, etc.) may also be used as long as their functions correspond with those taught by the present invention.

The present invention provides a method that allows an entity that performed management or control of a system (mobile station or base station) to manage the MAC layer and the PHY layer by transferring primitives from a MAC layer, through a NCMS (Network Control Management System), to the necessary upper management entity. In particular, when the mobile station operates in sleep mode, a method of defining the primitives that need to be transferred between the MAC layer and the upper management entity via the NCMS in the protocol stacks within the mobile station and the base station is provided.

Hereafter, the management entity refers to all entities that interface with the NCMS, and can be any logical management entity or physical management entity that exists in the IP layer or its upper layer within a device. The operation of the present invention may look as if the NCMS directly sends (delivers) the primitives, because communication is performed from the upper management entity, via the NCMS, to the Management SAP (M-SAP) or Control SAP (C-SAP).

The upper management entity used in the present invention can be located above a layer management entity within a protocol stack as shown in FIG. 1, and be divided into a physical or logical upper management entity that communicates through the NCMS or management SAP of a layer management entity. The upper management entity may exist within a particular protocol stack or may exist as a separate and independent system or stack, but will be conceptually referred to as an upper management entity.

Figure 3:
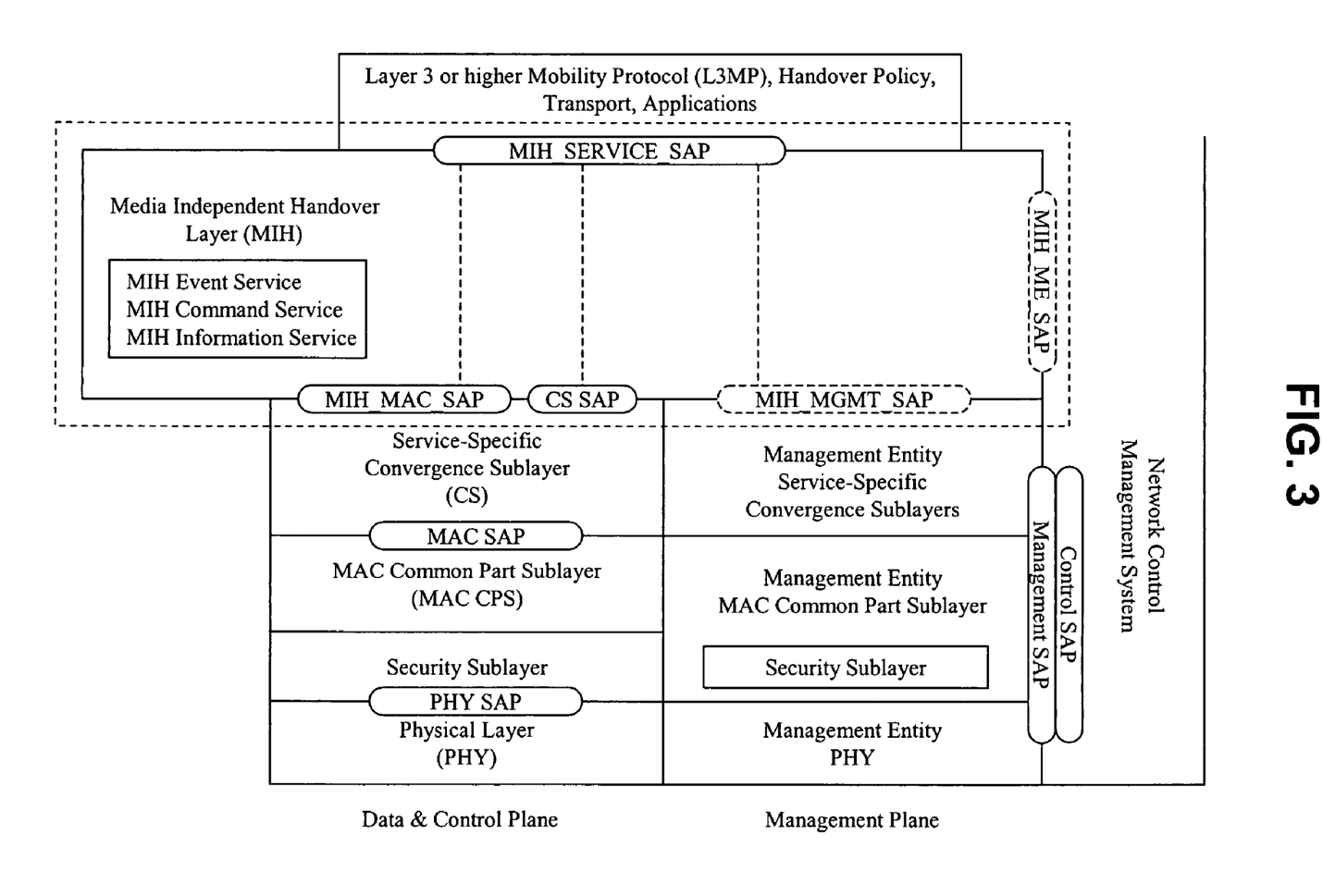
FIG. 3 depicts an exemplary protocol architecture model that considers Media Independent Handover (MIH).

FIG. 3 depicts an exemplary protocol architecture model that considers Media Independent Handover (MIH).

The primitives provided by the present invention are delivered (transferred) to the NCMS (Network Control & Management System) via a Management SAP (M-SAP) or a Control SAP (C-SAP), and the NCMS can deliver (transfer) the primitives to the necessary locations including the upper management entities.

The M-SAP can have the functions for performing system configuration, for monitoring statistics, for notifications/triggers, etc., but are not limited to only these functions. The C-SAP can have the functions for performing handovers (e.g., notification of HO request from MS, etc.), for idle mode mobility management (e.g., mobile entering idle mode), for subscriber and session management (e.g., mobile requesting session setup), for radio resource management, etc., but are not limited to only these functions. Although the primitives of the present invention may be distinguished according to their functions above, such primitives can be delivered through the M-SAP and/or C-SAP.

Figure 4:
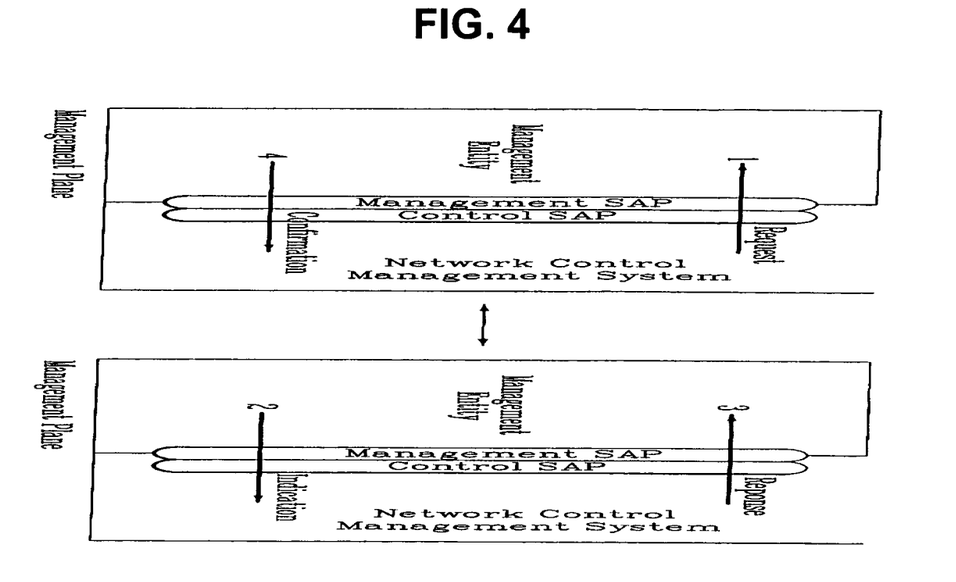
FIGS. 4 and 5 depict the principles of how the primitives operate according to the present invention.
Figure 5:
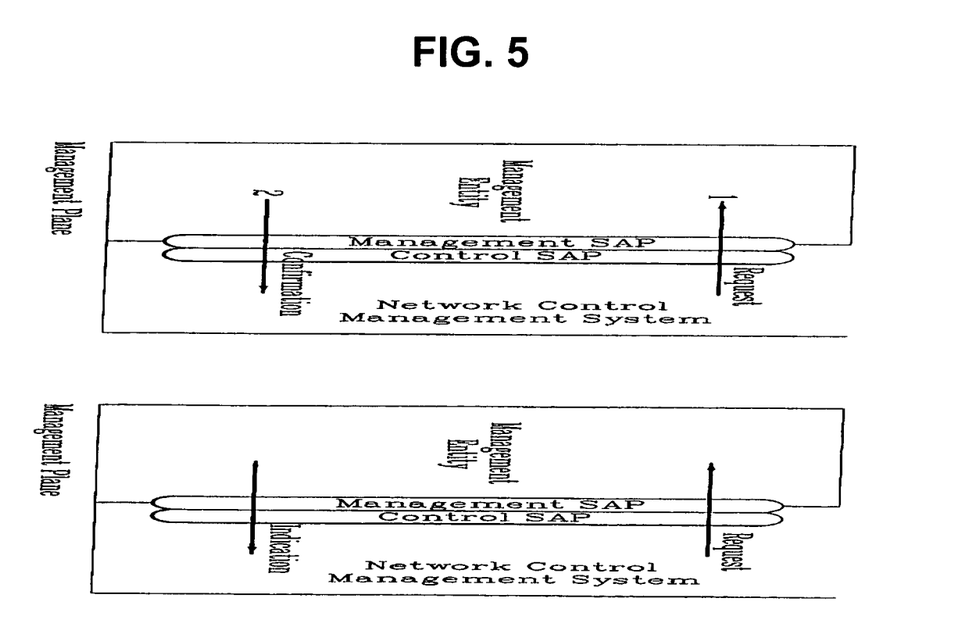

FIGS. 4 and 5 depict the principles of how the primitives operate according to the present invention. Primitives that require cooperation with a remote entity are shown in FIG. 4, while primitives that are only delivered within a local stack are shown in FIG. 5.

As shown in FIG. 4, when there is cooperation with a remote entity, a pair of operations comprising a Request and Confirmation or comprising a Response and Indication are performed.

As shown in FIG. 5, when operations occur within a local stack, there may be two situations: mutual exchanges between the management entity and the NCMS (i.e., a bi-directional operation) or a uni-directional operation. For bi-directional operation, the delivery from the management entity through the M-SAP/C-SAP to the NCMS is called a Request, and its response that is transmitted is called an Indication. For uni-directional operation, the delivery from the management entity through the M-SAP/C-SAP to the NCMS is called a Request, and a uni-directional delivery in the opposite direction is called an Indication.

The primitives according to the present invention may be used for a multi-mode mobile station in which a management entity instructs a corresponding mode or when the corresponding mode delivers information to the entity that manages all the multi-modes. In such case, the following two situations can exist.

First, when the primitives are delivered from the MIH layer or MIH function to a lower layer, the MIH (layer or function) may interpret the information (e.g., commands, etc.) received from an upper layer when delivering the corresponding primitive or the upper layer information (command) may be mapped with the commands of the present invention and transmitted.

Second, when the primitives are delivered from the lower layer to the MIH layer or MIH function, the MIH (layer or function) may interpret the primitive received from the lower layer when transmitting the corresponding primitive (i.e., a unified primitive defined at the MIH) to be delivered to the upper layer or the primitive of the lower layer and the primitive to be sent to the upper layer may be simply mapped and then transmitted.

When used in Media Independent Handover (MIH), the primitives defined by the present invention may be delivered through the SAP between the NCMS and the MIH or the SAP between the management entity and the MIH such that MIH techniques can be achieved.

A method of supporting sleep mode in a broadband wireless access system comprises: instructing a sleep mode request by delivering a first primitive from a mobile station upper management entity to a mobile station MAC layer, which is a lower layer; requesting a change into sleep mode by sending a sleep request message from the mobile station MAC layer to the base station; receiving a sleep response message from the base station; and changing into sleep mode according to the instructions in the sleep response message.

In order to support sleep mode for a mobile station in a broadband wireless access system, MAC messages transmitted and received with the base station and the primitives provided by the present invention are employed, and the embodiments that explain the operation performed between the upper management entity and the MAC layer via the NCMS within the mobile station and the base station will be described with reference to FIG. 6.

Figure 6:
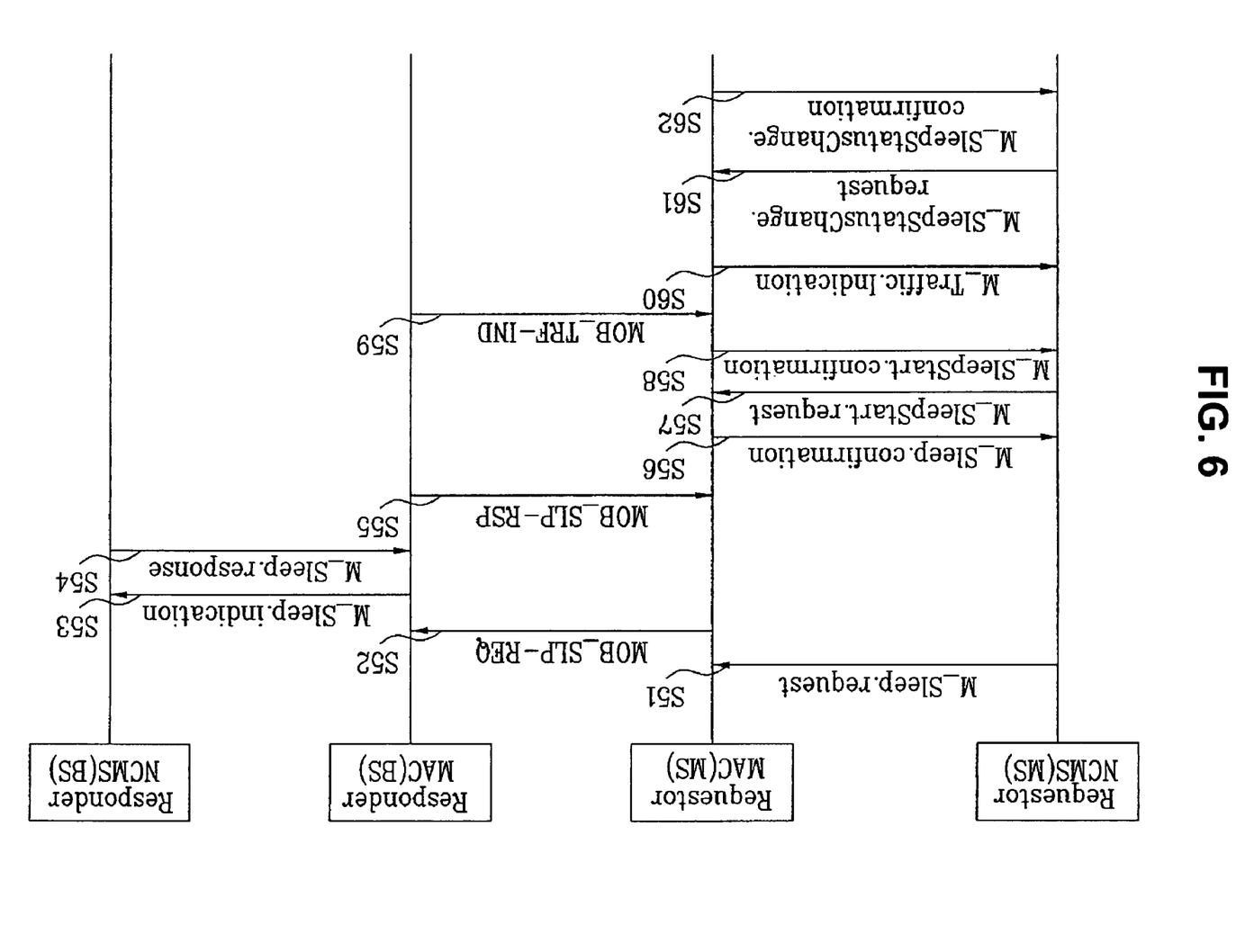
FIG. 6 depicts a signal flow of an exemplary embodiment of the present invention.

FIG. 6 depicts a flow chart of an exemplary embodiment of the present invention. When the mobile station wishes to change into sleep mode to conserve power, the upper management entity of the mobile station delivers a M_Sleep.request primitive to its LAC layer in order to request a change into sleep mode [S51]. Upon receiving the M_Sleep.request primitive, the mobile station MAC layer sends a MOB_SLP_REQ message to the base station to request a change into sleep mode [S52].

The base station MAC layer and the base station upper management entity exchange a M_Sleep.indication primitive and a M_Sleep.response primitive to authorize one or more parameters related to sleep mode [S53, S54].

Upon receiving the M_Sleep.response primitive from the base station upper management entity, the base station MAC layer sends a MOB_SLP-RSP message to the mobile station to authorize the mobile station to enter its sleep mode [S55]. However, even if the mobile station requested a change into sleep mode, the base station may reject such sleep mode request.

Upon receiving the MOB_SLP_RSP message from the base station, the mobile station MAC layer delivers a M_Sleep.confirmation primitive to the mobile station upper management entity to inform about the processing result related to the sleep mode change request of the base station [S56]. Upon sending and receiving the M_Sleep.confirmation primitive, the mobile station MAC layer and the upper management entity exchange a M_SleepStart.request primitive and a M_SleepStart.confirmation primitive [S57, S58], and then the mobile station can change into sleep mode state. Here, if the mobile station MAC layer is not successful in changing into sleep mode state, the failure of changing into sleep mode is informed through a Result Code of the M_SleepStart.confirmation primitive.

While the mobile station is in sleep mode, the base station sends to the mobile station MAC layer, a MOB_TRF_IND message to inform whether there is any downlink traffic from the base station [S59]. Upon receiving the MOB_TRF_IND message from the base station, the mobile station MAC layer informs its upper management entity whether there is any downlink traffic by sending a M_Traffic.indication primitive [S60].

Upon receiving the M_Traffic.indication primitive, the mobile station upper management entity delivers a M_SleepStatusChange.request primitive to the mobile station MAC layer to instruct whether the mobile station should change into sleep mode or maintain its current state [S61]. Upon receiving the M_SleepStatusChange.request primitive, the mobile station MAC layer performs the action indicated by the M_SleepStatusChange.request primitive, and the results thereof are reported to the mobile station upper management entity via a M_SleepStatusChange.confirmation primitive [S62].

As explained with reference to FIG. 6, the primitives transmitted through the Management SAP (M_SAP) and/or the Control SAP (C_SAP) to perform sleep mode by the mobile station and to request sleep mode from the base station will be explained in more detail hereafter.

(1) M_Sleep.request Primitive

1) Function

The NCMS of the mobile terminal can request a change into sleep mode by transmitting a M_Sleep.request primitive to a MAC layer.

2) Semantics

M_Sleep.request{
Source,
Destination,
Definition,
Power Saving Class Type,
Operation,
Power_Saving_Class_ID
}

The following table 1 shows an exemplary data format of the M_Sleep.request primitive.

TABLE 1

| Name | Type | Valid Range | Description |
|---|---|---|---|
| Source | | | Start point of Request Primitive |
| Destination | | | End point of Request Primitive |
| Definition | Enumeration | Definition of Power Saving Class present Definition of Power Saving Class absent | Whether or not Power Saving Class exists |
| Power_Saving Class_ID | | | Identifier of Power Saving Class |
| Operation | Enumeration | Activation of Power Saving Class Deactivation of Power Saving Class | Whether or not Power Saving Class is activated |
| Power Saving Class Type | Enumeration | Type 1 Type 2 Type 3 | Selection of Type 1, Type 2, and Type 3 |

In the semantics of the M_Sleep.request primitive, an operation of a sleep window according to a power saving class is not defined. However, the upper management entity can define the sleep window according to the power saving class as a parameter, and thereby transmit the parameter to the mobile station MAC layer.

3) Time of Formation

The M_Sleep.request primitive is formed by the upper management entity of the mobile terminal when the mobile terminal requests a sleep mode state in order to minimize power consumption.

4) Effect when Received

When the mobile station MAC layer receives the M_Sleep.request primitive, a message (MOB_SLP_REQ) for requesting a change into sleep mode is transmitted to the base station MAC layer.

(2) M_Sleep.indication Primitive
1) Function

The M_Sleep.indication primitive is used for the base station MAC layer to inform to the upper management object that a mode conversion into a sleep mode is requested by a specific mobile terminal.

2) Semantics

```
M_Sleep.indication {
Source,
Destination,
Power Saving Class Type,
Definition,
Operation,
Power_Saving_Class_ID,
Start_frame_nunber.
Listening window,
Initial_Sleep window,
Final_Sleep window base,
Final_Sleep window exponent
Number of CID,
N_Sleep_CID
}
```

The following Table 2 shows an exemplary data format of the M_Sleep.indication primitive.

TABLE 2

| Name | Type | Valid Range | Description |
|---|---|---|---|
| Source | | | Start point of Indication Primitive |
| Destination | | | End point of Indication Primitive |
| Definition | Enumeration | Definition of Power Saving Class present Definition of Power Saving Class absent | Whether or not Power Saving Class exists |
| Power_Saving Class_ID | | | Identifier of Power Saving Class |
| Operation | Enumeration | Activation of Power Saving Class Deactivation of Power Saving Class | Whether or not Power Saving Class is activated |
| Start_frame_number | | | Start frame of sleep window |
| Listening window | | | Frame allocated for listening window |
| Initial_sleep window | | | Allocated initial sleep window |
| Final_sleep window base | | | Final value allocated for sleep period |
| Final_sleep window exponent | | | Allocated value to which Final_sleep window base is multiplied for calculation of final sleep window |
| Number of CID | | | Number of connection IDs |
| N_Sleep_CID | | | Number of Sleep CIDs |

3) Time of Formation

The M_Sleep.indication primitive is formed when the mobile station MAC entity receives a sleep mode request message (MOB_SLP_REQ).

4) Effect when Received

When the upper management entity of the base station receives the M_Sleep.indication primitive, it determines whether to accept a sleep mode requested by a specific mobile terminal and then informs the determination to the base station MAC layer through a M_Sleep.response primitive.

(3) M_Sleep.response Primitive
1) Function

The M_Sleep.response primitive is used when the upper management entity of the base station informs the base station MAC layer about its determination of whether to allow a sleep mode requested by a specific mobile terminal.

2) Semantics

```
M_Sleep.response {
Source,
Destination,
Power Saving Class Type,
Definition,
Operation,
Power_Saving_Class_ID,
REQ_duration,
Start_frame_number
Listening window,
Initial_sleep window,
Final_Sleep window base,
Final_Sleep window exponent,
```

-continued

```
Number of CID,
N_Sleep_CID
}
```

The following Table 3 shows an exemplary data format of the M_Sleep.response primitive.

TABLE 3

| Name | Type | Valid Range | Description |
| --- | --- | --- | --- |
| Source | | | Start point of Response Primitive |
| Destination | | | End point of Response Primitive |
| Definition | Enumeration | Definition of Power Saving Class present Definition of Power Saving Class absent | Whether or not Power Saving Class exists |
| Power_Saving Class_ID | | | Identifier of Power Saving Class |
| Operation | Enumeration | Activation of Power Saving Class Deactivation of Power Saving Class | Whether or not Power Saving Class is activated |
| REQ-duration | | | Value for waiting for re-transmission when sleep request message is not received |
| Start_frame_number | | | Sleep window start frame |
| Listening window | | | Allocated listening window frame |
| Initial_sleep window | | | Allocated initial sleep window |
| Final_sleep window base | | | Final value allocated for sleep period |
| Final_sleep window exponent | | | Allocated value to which Final_sleep window base is multiplied for calculation of final sleep window |
| Number of CID | | | Number of connection IDs |
| N_Sleep_CID | | | Number of Sleep CIDs |

3) Time of Formation

The M_Sleep.response primitive is formed when the upper management entity of the base station that has received the M_Sleep.indication determines to inform the result thereof.

4) Effect when Received

The base station MAC layer transmits a sleep mode response (MOB_SLP_RSP) message to the mobile terminal MAC layer with the inclusion of the parameters received through the M_Sleep.response primitive.

(4) M_Sleep.confirmation Primitive

1) Function

The M_Sleep.confirmation primitive is used to inform the result of the sleep mode response message to the upper management entity of the mobile station.

2) Semantics

M_Sleep.confirmation {
Source,
Destination,
Power Saving Class Type,
Definition,
Operation,
Power_Saving_Class_ID,
REQ-duration,
Start_frame_number.
Listening window,
Initial_sleep window,
Final_Sleep window base,
Final_Sleep window exponent,
Number of CID,
N_Sleep_CID
}

The following Table 4 shows an exemplary data format of the M_Sleep.confirmation primitive.

TABLE 4

| Name | Type | Valid Range | Description |
| --- | --- | --- | --- |
| Source | | | Start point of Confirmation Primitive |
| Destination | | | End point of Confirmation Primitive |

TABLE 4-continued

| Name | Type | Valid Range | Description |
|---|---|---|---|
| Definition | Enumeration | Definition of Power Saving Class present Definition of Power Saving Class absent | Whether or not Power Saving Class exists |
| Power_Saving Class_ID | | | Identifier of Power Saving Class |
| Operation | Enumeration | Activation of Power Saving Class Deactivation of Power Saving Class | Whether or not Power Saving Class is activated |
| REQ-duration | | | Value for waiting for re-transmission when sleep request message is not received |
| Start_frame_number | | | Sleep window start frame |
| Listening window | | | Allocated listening window frame |
| Initial_sleep window | | | Allocated initial sleep window |
| Final_sleep window base | | | Final value allocated for sleep period |
| Final_sleep window exponent | | | Allocated value to which Final_sleep window base is multiplied for calculation of final sleep window |
| Number of CID | | | Number of connection IDs |
| N_Sleep_CID | | | Number of Sleep CIDs |

3) Time of Formation

The M_Sleep.confirmation primitive is formed when the mobile station MAC layer receives the sleep mode response (MOB_SLP_RSP) message from the base station MAC layer.

4) Effect when Received

Used to receive the results from the base station with respect to the mobile terminal changing into sleep mode state.

(5) M_SleepStart.request Primitive

1) Function

The M_SleepStart.request primitive is used in order to instruct whether to convert a mode of the mobile terminal into a sleep mode or whether to maintain a current state of the mobile terminal according to the M_Sleep.confirmation primitive.

2) Semantics

```
M_SleepStart.request {
Source,
Destination,
Action Code,
}
```

The following Table 5 shows an exemplary data format of the M_SleepStart.request primitive.

3) Time of Formation

The M_SleepStart.request primitive is formed after the upper management entity of the mobile station receives the M_Sleep.confirmation primitive from the MAC layer.

4) Effect when Received

The mobile terminal performs an action to convert into a sleep mode or to maintain a current normal state according to the Action Code.

(6) M_SleepStart.confirmation Primitive

1) Function

The M_SleepStart.confirmation primitive is used to check whether the request from the M_SleepStart.request primitive has been successful.

2) Semantics

```
M_SleepStart.confirmation {
Source,
Destination,
Result code
}
```

The following Table 6 shows an exemplary data format of the M_SleepStart.request primitive.

TABLE 5

| Name | Type | Valid Range | Description |
|---|---|---|---|
| Source | | | Start point of Request Primitive |
| Destination | | | End point of Request Primitive |
| Action Code | Enumeration | Maintain normal status Start sleep status | |

TABLE 6

| Name | Type | Valid Range | Description |
|---|---|---|---|
| Source | | | Start point of Request Primitive |
| Destination | | | End point of Request Primitive |
| Result code | Enumeration | 0: Success 1: Fail | Whether or not operation has been successful |

3) Time of Formation

The M_SleepStart.confirmation primitive is formed by the mobile terminal MAC layer after performing an operation according to the Action Code after receiving M_SleepStart.request primitive.

4) Effect when Received

Determine whether mobile station performed state transition according to instructions.

(7) M_Traffic.indication Primitive

1) Function

The M_Traffic.indication primitive is used to provide information to the upper management entity to indicate whether any downlink traffic should be transmitted from the base station to the mobile terminal in a sleep mode.

2) Semantics

```
M_Traffic.indication {
Source,
Destination,
SLPID Group Indication Bitmap,
Traffic Indication Bitmap
}
```

The following Table 7 shows an exemplary data format of the M_Traffic.indication primitive.

TABLE 7

| Name | Type | Valid Range | Description |
| --- | --- | --- | --- |
| Source | | | Start point of Indication Primitive |
| Destination | | | End point of Indication Primitive |
| SLPID Group Indication Bitmap | Enumeration | | Group mapping of SLPID 0: when no traffic exists in all SLPIDs 1: when at least one SLPID having traffics exists among SLPIDs |
| Traffic Indication Bitmap | Enumeration | Traffic absence Traffic existence | Whether or not traffic exists |

3) Time of Formation

The M_Traffic.indication primitive is formed after receiving a downlink traffic start (MOB_TF_IND) message from the base station MAC layer.

4) Effect when Received

The upper management entity of the mobile station checks whether or not any downlink traffic exists by information provided from the M_Traffic.indication primitive, and thereby performs an action to terminate a sleep mode or to maintain a normal state.

(8) M_SleepStatusChange.request Primitive

1) Function

The M_SleepStatusChange.request primitive is used by the upper management entity to request the mobile station to maintain or to terminate a sleep mode.

2) Semantics

```
M_Status.request {
Source,
Destination,
Action code
}
```

The following Table 8 shows an exemplary data format of the M_Status.request primitive.

TABLE 8

| Name | Type | Valid Range | Description |
| --- | --- | --- | --- |
| Source | | | Start point of Request Primitive |
| Destination | | | End point of Request Primitive |
| Action Code | Enumeration | Terminate sleep mode Maintain sleep mode | Operation command for sleep mode |

3) Time of Formation

The M_SleepStatusChange.request primitive is formed after the upper management entity of the mobile station receives the M_Traffic.indication primitive from the MAC layer.

4) Effect when Received

Indicates whether to terminate a sleep mode or to maintain the sleep mode by the mobile terminal MAC layer.

(9) M_Status.confirmation Primitive

1) Function

The M_Status.confirmation primitive is used to check whether or not the request from the M_SleepStatusChange.request primitive has been successful.

2) Semantics

```
M_SleepStatusChange.confirmation {
Source,
Destination,
Result code
}
```

The following Table 9 shows an exemplary data format of the M_SleepStatusChange.confirmation primitive.

TABLE 9

| Name | Type | Valid Range | Description |
| --- | --- | --- | --- |
| Source | | | Start point of Confirmation Primitive |
| Destination | | | End point of Confirmation Primitive |
| Result code | Enumeration | Success Fail | Whether or not operation has been successful |

3) Time of Formation

The M_SleepStatusChange.confirmation primitive is formed after the mobile terminal MAC layer receives the M_SleepStatusChange.request primitive from the upper management entity and then performs an operation according to the Action Code.

4) Effect when Received

A current state of an operation instructed to the MAC layer from the upper management entity of the mobile terminal by the M_SleepStatusChange.request primitive can be clearly determined by receiving the M_SleepStatusChange.confirmation primitive.

To implement the various features described above, the present invention can employ various types of hardware and/or software components (modules). For example, different hardware modules may contain various circuits and components necessary to perform the steps of the above method of executing scanning in a broadband wireless access system. Also, different software modules (executed by processors and/or other hardware) may contain various codes and protocols necessary to perform the steps of the present invention method.

For sleep mode (viewpoint of MS MAC), the present invention provides a method of supporting sleep mode of a mobile station in a broadband wireless access system, comprising: receiving, from a MS NCMS, a first primitive that indicates a sleep request; sending, to a network, a sleep request message; receiving, from the network, a sleep response message; sending, to the MS NCMS, a second primitive that indicates a sleep confirmation; receiving, from the network, a traffic indication message; and optionally sending, to the MS NCMS, a third primitive that indicates whether there is traffic or not. The first primitive, the sleep request message, the sleep response message, and the second primitive may comprise at least one of a power saving class ID, operation, start frame number, listening window, initial sleep window, final sleep window base, final sleep window exponent, number of CIDs, number of sleep CIDs, and REG duration. The method may further comprise: receiving, from the MS NCMS, a fourth primitive that indicates a sleep start request; and sending, to the MS NCMS, a fifth primitive that indicates a result of the sleep start request, wherein the result indicates success or failure of the sleep start request. The fourth primitive may comprises an action code. The action code indicates maintain normal status or start sleep status. The method may further comprise: receiving, from the MS NCMS, a sixth primitive that indicates a sleep status change request; and sending, to the ms NCMS, a seventh primitive that indicates a result of the sleep status change request, wherein the result indicates success or failure of the sleep status change request. The sixth primitive comprises an action code. The action code indicates sleep mode termination or sleep mode sustain.

For sleep mode (viewpoint of MS MIH), the present invention provides a method of supporting sleep mode of a mobile station in a broadband wireless access system, comprising: establishing a unified interface to an upper layer of the mobile station for managing messages to and from at least one of a homogeneous network and a heterogeneous network; sending, to a MS NCMS, a first message that allows the unified interface (MIH) to request a MS MAC to initiate sleep mode; receiving, from a MS MAC, a second message that indicates confirmation of the initiated sleep mode; and optionally receiving, from the MS MAC, a third message that indicates whether there is traffic or not. The first message and the second message comprises at least one of a power saving class ID, operation, start frame number, listening window, initial sleep window, final sleep window base, final sleep window exponent, number of CIDs, number of sleep CIDs, and REG duration. The method may further comprise: sending, to the MS NCMS, a fourth message that indicates a sleep start request; and receiving, from the MS NCMS, a fifth message that indicates a result of the sleep start request, wherein the result indicates success or failure of the sleep start request. The fourth message comprises an action code. The action code indicates maintain normal status or start sleep status. The method may further comprise: sending, to the MS NCMS, a sixth message that indicates a sleep status change request; and receiving, from the MS NCMS, a seventh message that indicates a result of the sleep status change request, wherein the result indicates success or failure of the sleep status change request. The sixth message comprises an action code. The action code indicates sleep mode termination or sleep mode sustain.

For sleep mode (viewpoint of BS MAC), the present invention provides a method of supporting sleep mode of a mobile station in a broadband wireless access system, comprising: receiving, from a MS MAC, a sleep request message; sending, to a network NCMS or upper entity, a first primitive that indicates a sleep request; receiving, from the network NCMS or upper entity, a second primitive that indicates a result of the sleep request; and sending, to the MS MAC, a sleep response message. The first primitive, the sleep request message, the sleep response message, and the second primitive comprises at least one of a power saving class ID, operation, start frame number, listening window, initial sleep window, final sleep window base, final sleep window exponent, number of CIDs, number of sleep CIDs, and REG duration.

For sleep mode (viewpoint of BS MIH), the present invention provides a method of supporting sleep mode of a mobile station in a broadband wireless access system, comprising: establishing a unified interface to an upper layer of a network for managing messages to and from at least one of a homogeneous network and a heterogeneous network; receiving, from a network NCMS, a first message that indicates a sleep request; and sending, to the network NCMS, a second message that indicates a confirmation of the sleep request. The first message and the second message comprises at least one of a power saving class ID, operation, start frame number, listening window, initial sleep window, final sleep window base, final sleep window exponent, number of CIDs, number of sleep CIDs, and REG duration.

As for the results of the present invention, when the mobile station performs sleep mode by using the primitives defined according to the present invention, accurate operations within the protocol stack layers can be achieved. Accordingly, Media Independent Handover (MIH) procedures can be achieved because the NCMS and MIH layer can communicate in a direct or indirect manner through use of the primitives.

This specification describes various illustrative embodiments of the present invention. The scope of the claims is intended to cover various modifications and equivalent arrangements of the illustrative embodiments disclosed in the specification. Therefore, the following claims should be accorded the reasonably broadest interpretation to cover modifications, equivalent structures, and features that are consistent with the spirit and scope of the invention disclosed herein.

The invention claimed is:

1. A method of supporting sleep mode of a mobile station (MS) in a broadband wireless access system, the method comprising:
  receiving, from a MS network control management system (NCMS), a first primitive that indicates a sleep request;
  sending, to the MS NCMS, a second primitive that indicates a sleep confirmation after sending, to a network, a sleep request message and receiving, from the network, a sleep response message;
  sending, to the MS NCMS, a third primitive that indicates whether there is traffic or not, in response to receiving, from the network, a traffic indication message;
  receiving, from the MS NCMS, a fourth primitive that indicates a sleep start request; and
  sending, to the MS NCMS, a fifth primitive that indicates a result of the sleep start request, wherein the result indicates success or failure of the sleep start request,
  wherein the fourth primitive comprises an action code, the action code indicating maintain normal status or start sleep status.

2. The method of claim 1, wherein the first primitive, the sleep request message, the sleep response message, and the second primitive comprises at least one of a power saving class ID, (CID), operation, start frame number, listening window, initial sleep window, final sleep window base, final sleep window exponent, number of CIDs, number of sleep CIDs, and REG duration.

3. The method of claim 1, further comprising:
receiving, from the MS NCMS, a sixth primitive that indicates a sleep status change request; and
sending, to the MS NCMS, a seventh primitive that indicates a result of the sleep status change request, wherein the result indicates success or failure of the sleep status change request.

4. The method of claim 3, wherein the sixth primitive comprises an action code.

5. The method of claim 4, wherein the action code indicates sleep mode termination or sleep mode sustain.

6. A method of supporting sleep mode of a mobile station (MS) in a broadband wireless access system, the method comprising:
establishing a unified interface media independent handover (MIH) to an upper layer of the MS for managing messages to and from at least one of a homogeneous network and a heterogeneous network;
sending, to a MS network control management system (NCMS), a first message that allows the unified interface MIH to request a MS MAC to initiate sleep mode;
receiving, from a MS MAC, a second message that indicates confirmation of the initiated sleep mode; and
receiving, from the MS MAC, a third message that indicates whether there is traffic or not;
sending, to the MS NCMS, a fourth message that indicates a sleep start request; and
receiving, from the MS NCMS, a fifth message that indicates a result of the sleep start request, wherein the result indicates success or failure of the sleep start request.

7. The method of claim 6, wherein the first message and the second message comprises at least one of a power saving class ID (CID), operation, start frame number, listening window, initial sleep window, final sleep window base, final sleep window exponent, number of CIDs, number of sleep CIDs, and REG duration.

8. The method of claim 6, wherein the fourth message comprises an action code.

9. The method of claim 8, wherein the action code indicates maintain normal status or start sleep status.

10. The method of claim 6, further comprising: sending, to the MS NCMS, a sixth message that indicates a sleep status change request; and
receiving, from the MS NCMS, a seventh message that indicates a result of the sleep status change request, wherein the result indicates success or failure of the sleep status change request.

11. The method of claim 10, wherein the sixth message comprises an action code.

12. The method of claim 11, wherein the action code indicates sleep mode termination or sleep mode sustain.

13. A method of supporting sleep mode of a mobile station in a broadband wireless access system, the method comprising:
sending, to a network control management system (NCMS) or upper entity, a first primitive that indicates a sleep request after receiving, from a MS MAC, a sleep request message;
receiving, from the network NCMS or upper entity, a second primitive that indicates a result of the sleep request; and
sending, to the MS MAC, a sleep response message.

14. The method of claim 13, wherein the first primitive, the sleep request message, the sleep response message, and the second primitive comprises at least one of a power saving class ID (CID), operation, start frame number, listening window, initial sleep window, final sleep window base, final sleep window exponent, number of CIDs, number of sleep CIDs, and REG duration.

15. The method of claim 13 further comprising:
establishing a unified interface to an upper layer of a network for managing messages to and from at least one of a homogeneous network and a heterogeneous network;
receiving, from a network NCMS, a first message that indicates a sleep request; and
sending, to the network NCMS, a second message that indicates a confirmation of the sleep request.

16. The method of claim 15, wherein the first message and the second message comprises at least one of a power saving class ID (CID), operation, start frame number, listening window, initial sleep window, final sleep window base, final sleep window exponent, number of CIDs, number of sleep CIDs, and REG duration.

* * * * *